(12) United States Patent
Lamb et al.

(10) Patent No.: US 11,308,534 B2
(45) Date of Patent: Apr. 19, 2022

(54) AUTOMATED THIRD-PARTY COST ESTIMATION AND PRODUCTION

(71) Applicant: Packsize LLC, Salt Lake City, UT (US)

(72) Inventors: Thomas Lamb, Syracuse, UT (US); Aaron Reel, Herriman, UT (US); Hansemann Kiessner, Salt Lake City, UT (US)

(73) Assignee: PACKSIZE LLC, Salt Lake City, UT (US)

( * ) Notice: Subject to any disclaimer, the term of this patent is extended or adjusted under 35 U.S.C. 154(b) by 58 days.

(21) Appl. No.: 16/838,240

(22) Filed: Apr. 2, 2020

(65) Prior Publication Data

US 2020/0320597 A1 Oct. 8, 2020

Related U.S. Application Data

(60) Provisional application No. 62/830,171, filed on Apr. 5, 2019.

(51) Int. Cl.
*G06Q 30/06* (2012.01)
*G06Q 30/02* (2012.01)
(Continued)

(52) U.S. Cl.
CPC ......... *G06Q 30/0621* (2013.01); *B32B 29/08* (2013.01); *G05B 19/4188* (2013.01);
(Continued)

(58) Field of Classification Search
CPC ........... G06Q 30/0631; G06Q 30/0621; G06Q 30/0283; G06Q 10/087; G06Q 10/06315; G06Q 50/04; B32B 29/08; G05B 19/4188
(Continued)

(56) References Cited

U.S. PATENT DOCUMENTS 9,840,347 B1 * 12/2017 Linnell .................. B65D 81/09
2003/0229543 A1 * 12/2003 Zimmerman ...... G06Q 30/0601
705/26.1

(Continued)

FOREIGN PATENT DOCUMENTS

CN        103889703 B  * 10/2016  ......... B31B 2100/00
WO  WO-2012018859 A1 *  2/2012  ............. G06Q 10/08

OTHER PUBLICATIONS

English Translation of CN 103889703 B published Oct. 19, 2016.*
(Continued)

*Primary Examiner* — Yogesh C Garg
(74) *Attorney, Agent, or Firm* — Workman Nydegger

(57) ABSTRACT

A computer system for automated third-party cost estimation and production management receives a request for a particular packaging design template. The system identifies, with a continuous monitoring software application, current system capabilities. The continuous monitoring software application is configured to query multiple packaging production machines located on different networks and at different locations, gather current operating characteristics of each packaging production machine selected from the multiple packaging production machines, and query a queue memory space at each packaging production machine selected from the multiple packaging production machines. Based upon the current system capabilities, the system selects a particular packaging production machine selected from the multiple packaging production machines to produce the particular packaging design template. The system then produces the particular packaging design template.

20 Claims, 5 Drawing Sheets

(51) Int. Cl.
　　　*G06Q 10/06* (2012.01)
　　　*G06Q 10/08* (2012.01)
　　　*G05B 19/418* (2006.01)
　　　*G06Q 50/04* (2012.01)
　　　*B32B 29/08* (2006.01)

(52) U.S. Cl.
　　　CPC ..... *G06Q 10/06315* (2013.01); *G06Q 10/087* (2013.01); *G06Q 30/0283* (2013.01); *G06Q 50/04* (2013.01)

(58) Field of Classification Search
　　　USPC ................................................ 705/26.5, 26.7
　　　See application file for complete search history.

(56) References Cited

U.S. PATENT DOCUMENTS

| | | | |
|---|---|---|---|
| 2013/0000252 A1* | 1/2013 | Pettersson | B65B 59/001 53/396 |
| 2014/0067104 A1* | 3/2014 | Osterhout | G06Q 50/28 700/97 |
| 2015/0363716 A1* | 12/2015 | Harnesk | G06Q 10/0631 705/7.12 |
| 2016/0239775 A1* | 8/2016 | Featherstone | G06Q 50/04 |
| 2018/0022493 A1 | 1/2018 | Lamb et al. | |
| 2018/0224837 A1* | 8/2018 | Enssle | G05B 19/4189 |

OTHER PUBLICATIONS

International Search Report and Written Opinion received for PCT Patent Application No. PCT/US2020/026515, dated May 27, 2020, 14 pages.

* cited by examiner

AUTOMATED THIRD-PARTY COST ESTIMATION AND PRODUCTION

CROSS-REFERENCE TO RELATED APPLICATIONS

This application claims the benefit of and priority to U.S. Provisional Patent Application Ser. No. 62/830,171 filed on 5 Apr. 2019 and entitled "AUTOMATED THIRD-PARTY COST ESTIMATION AND PRODUCTION," which application is expressly incorporated herein by reference in its entirety.

BACKGROUND

Shipping and packaging industries frequently use paperboard and other fanfold material processing equipment that converts fanfold materials into box templates. One advantage of such equipment is that a shipper may prepare boxes of required sizes as needed in lieu of keeping a stock of standard, pre-made boxes of various sizes. Consequently, the shipper can eliminate the need to forecast its requirements for particular box sizes as well as to store pre-made boxes of standard sizes. Instead, the shipper may store one or more bales of fanfold material, which can be used to generate a variety of box sizes based on the specific box size requirements at the time of each shipment. This allows the shipper to reduce storage space normally required for periodically used shipping supplies as well as reduce the waste and costs associated with the inherently inaccurate process of forecasting box size requirements.

In addition to reducing the inefficiencies associated with storing pre-made boxes of numerous sizes, creating custom sized boxes also reduces packaging and shipping costs. In the fulfillment industry it is estimated that shipped items are typically packaged in boxes that are about 40% larger than the shipped items. Boxes that are too large for a particular item are more expensive than a box that is custom sized for the item due to the cost of the excess material used to make the larger box. When an item is packaged in an oversized box, filling material (e.g., Styrofoam, foam peanuts, paper, air pillows, etc.) is often placed in the box to prevent the item from moving inside the box and to prevent the box from caving in when pressure is applied (e.g., when boxes are taped closed or stacked). These filling materials further increase the cost associated with packing an item in an oversized box.

Custom-sized boxes also reduce the shipping costs associated with shipping items compared to shipping the items in oversized boxes. A shipping vehicle filled with boxes that are 40% larger than the packaged items is much less cost efficient to operate than a shipping vehicle filled with boxes that are custom sized to fit the packaged items. In other words, a shipping vehicle filled with custom sized packages can carry a significantly larger number of packages, which can reduce the number of shipping vehicles required to ship that same number of items. Accordingly, in addition or as an alternative to calculating shipping prices based on the weight of a package, shipping prices are often affected by the size of the shipped package. Thus, reducing the size of an item's package can reduce the price of shipping the item.

In some circumstances, however, relying upon packaging-production machines can create bottlenecks and inefficiencies in the packaging work flow. For example, during busy seasons, the packaging-production machines may not be able to keep up with the flow of products. In contrast, during slow times, packaging-production machines may remain idle. Both of these circumstances are not ideal and result in undesired costs.

Although packaging-production machines and related equipment can potentially reduce inconveniences and costs associated with stocking and using standard sized shipping supplies, the process for making and using custom-made, just-in-time packaging design templates can nevertheless be improved through the order in which the packaging design templates are created and used.

BRIEF SUMMARY

At least one embodiment disclosed herein comprises a computer system for automated third-party cost estimation and production receives a request for a particular packaging design template. The system identifies, with a continuous monitoring software application, current system capabilities. The continuous monitoring software application is configured to query multiple packaging production machines located on different networks and at different locations, gather current operating characteristics of each packaging production machine selected from the multiple packaging production machines, and query a queue memory space at each packaging production machine selected from the multiple packaging production machines. Based upon the current system capabilities, the system selects a particular packaging production machine selected from the multiple packaging production machines to produce the particular packaging design template. The system then produces the particular packaging design template.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

DETAILED DESCRIPTION

Disclosed embodiments include technological solutions for minimizing idle time of packaging-production machines and also safely implementing an interface to third parties to leverage uncommitted queue space for the production of custom-made packaging solutions. One will appreciate that such a system utilizes complex network communications, memory space management within queues, packaging-production machine management, and other related technologies.

Figure 1:
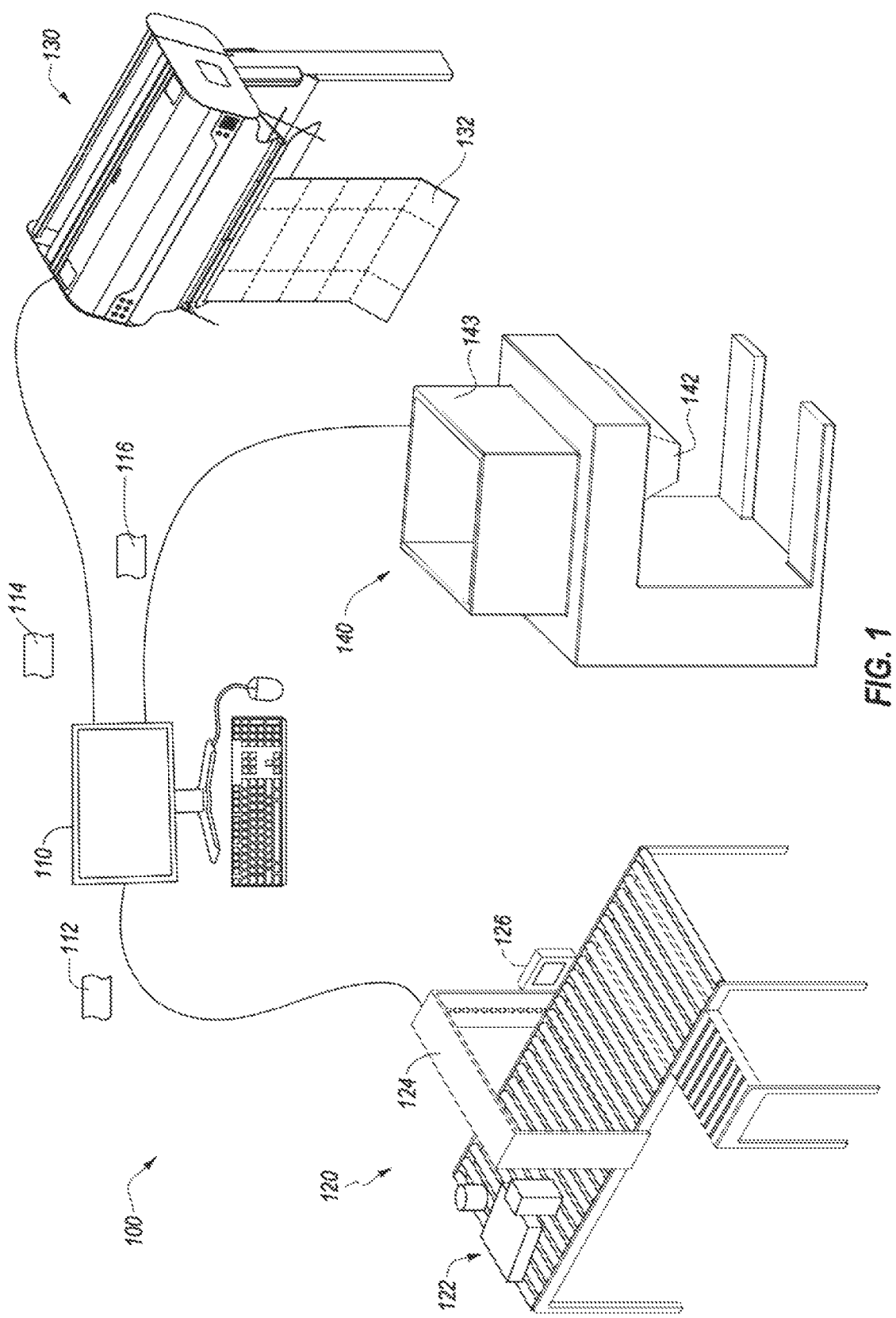
FIG. 1 illustrates a schematic of an embodiment of a packaging system.

Turning now to the figures, FIG. 1 illustrates a schematic diagram of an embodiment of a packaging system 100. The depicted packaging system 100 comprises various exemplary components, including an embodiment of a packaging system control unit 110, an embodiment of a product intake system 120, an embodiment of a packaging-production machine 130, and an embodiment of a dunnage-production machine 140. The various components and modules of packaging systems 100 described herein are provided only for the sake of clarity and example. One of skill in the art will understand that various alternative or additional modules or components can be used equivalently to the same effect. For example, multiple packaging system control units 110, product intake systems 120, packaging-production machines 130, and/or dunnage-production machines 140 can be used within the scope of the present disclosure.

In at least one embodiment, a picking system (not shown) provides a group of one or more target products 122 (also referred to herein as "objects") to the product intake system 120. The depicted product intake system 120 comprises a conveyor belt configured to transport the target products 122 through at least a portion of the packaging system 100. Additionally, the product intake system 120 may comprise dimensional input devices 124, in the form of one or more scanning sensors. In at least one embodiment, the one or more scanning sensors comprise a light curtain. The light curtain uses various light emitters and light detectors to measure both the height and width of the target products 122.

The depicted light curtain is provided only for the sake of example. In various alternative or additional embodiments, the product intake system comprises multiple dimensional input devices 124, such as light curtains for measuring different cross-sections of the group of one or more target products 122. Further, in additional or alternative embodiments, the product intake system 120 comprises other one or more dimensional input devices 124 for determining the dimensions of the target products 122. For example, the one or more dimensional input devices 124 may comprise a URL scanner 126 that scans a URL associated with each of the target products within the group of one or more target products 122. The URL scanner 126 may be in communication with a computer database (not shown) that stores the dimensional information for each product based upon its URL.

Similarly, the one or more dimensional input devices 124 may comprise devices for receiving manually entered dimension information, manually entered product description information, or any other manually entered information that allows the packaging system 100 to access a database and determine a packaging template size required to package the target products 122. In such a case, the product intake system 120 determines the overall dimensions of all the groups of one or more target products 122 based upon the stored dimensions of each individual product. Additionally or alternatively, the one or more dimensional input devices 124 can comprise a LIDAR sensor, a computer vision system, a laser distance measuring sensor, or any other system capable of measuring dimensions. Accordingly, various different apparatus and systems can be used to determine the dimensions of the group of one or more target products 122.

Further, in at least one embodiment, it is not necessary for a production intake system 120 to be present within the packaging system. For example, in some embodiments, users may simply provide inputs to the packaging system control unit 110 indicating a particular custom packaging design template. As used herein, a "packaging design template" refers to the digital and/or physical design that is converted into a physical corrugate box. As such, in some cases, the packaging design template describes the digital file that corresponds to the physical design of the corrugate, while in other embodiments the packaging design template describes the cut and creased corrugate that is ready to be folded and glued into a box. The packaging system control unit 110 communicates a command to the packaging production machine 130 to generate the requested custom packaging design template.

Once the product intake system 120 determines information relating to the physical dimensions of the group of one or more target products 122, the product intake system 120 communicates the information to the packaging system control unit 110. Alternatively, a user can manually enter in the requested packaging design, dimensions, quantity, and other package characteristics.

The packaging system control unit 110 may comprise a server, a desktop computer, an embedded system, a microcontroller, a cloud server, or any other computing device capable of communicating and processing information. The packaging system control unit 110 comprises a packaging database that contains various information relating to the packaging production system and to the one or more target products 122. For example, the packaging database includes information about available corrugate types, available packaging-production machines 130, available dunnage types, available dunnage-production machines 140, types of products that are to be packaged (e.g., the one or more target products 122), physical characteristics of the products to be packaged, special packaging needs associated with specific products, and other similar information.

In at least one embodiment, a cache of packaging design templates is stored near the product intake system 120. In such an embodiment, when the overall dimensions of an order are identified, an appropriate packaging design template may be immediately retrieved from the cache. A replacement packaging template design template can then be generated and placed in the cache to replace the previously removed packaging design template.

In at least one embodiment, the packaging system control unit 110 sends commands to the packaging production machine 130 that cause the machine to generate a custom-made packaging design template. The custom-made packaging design template may be produced to specially fit the one or more target products 122 or make the requested box size. Additionally, in at least one embodiment, the packaging system control unit 110 selects the particular packaging production machine 130 and corrugate that will be used to create the packaging design template. As such, the packaging system control unit 110 exercises significant control over the dimensions and materials that are used in the construction of a custom-made packaging design template.

The packaging production machine 130 comprises any machine capable of producing custom packages or package templates. The packaging production machine 130 is also associated with at least one type of bulk corrugate. For example, a packaging machine may be associated with both a relatively thinner and a relatively thicker corrugate. Additionally, different corrugates may have different strength characteristics, different production costs, different shipping costs, and various other different characteristics.

In at least one embodiment, the packaging system control unit 110 is also in communication with a dunnage production machine 140. The dunnage production machine 140 comprises any machine that is capable of automatically creating, measuring, and/or forming dunnage. For example, the depicted dunnage production machine 140 is configured to dispense from a hopper 143 a measured amount of foam peanuts. The foam peanuts are dispensed from a nozzle 142 into a target package. In additional or alternative embodiments, the dunnage production machine 140 is configured to create, measure, and/or form wood, matting, bubble wrap, air pillows, foam, cardboard, paper, plastic, mold formed cushioning, or any other type of material capable of functioning as dunnage.

One will appreciate that the above described packaging system 100 is provided for context and clarity purposes. In various other embodiments, the packaging system 100 may comprise different components, different machines, or may be combined into a single machine that performs any number of the above referenced functions.

Figure 2:
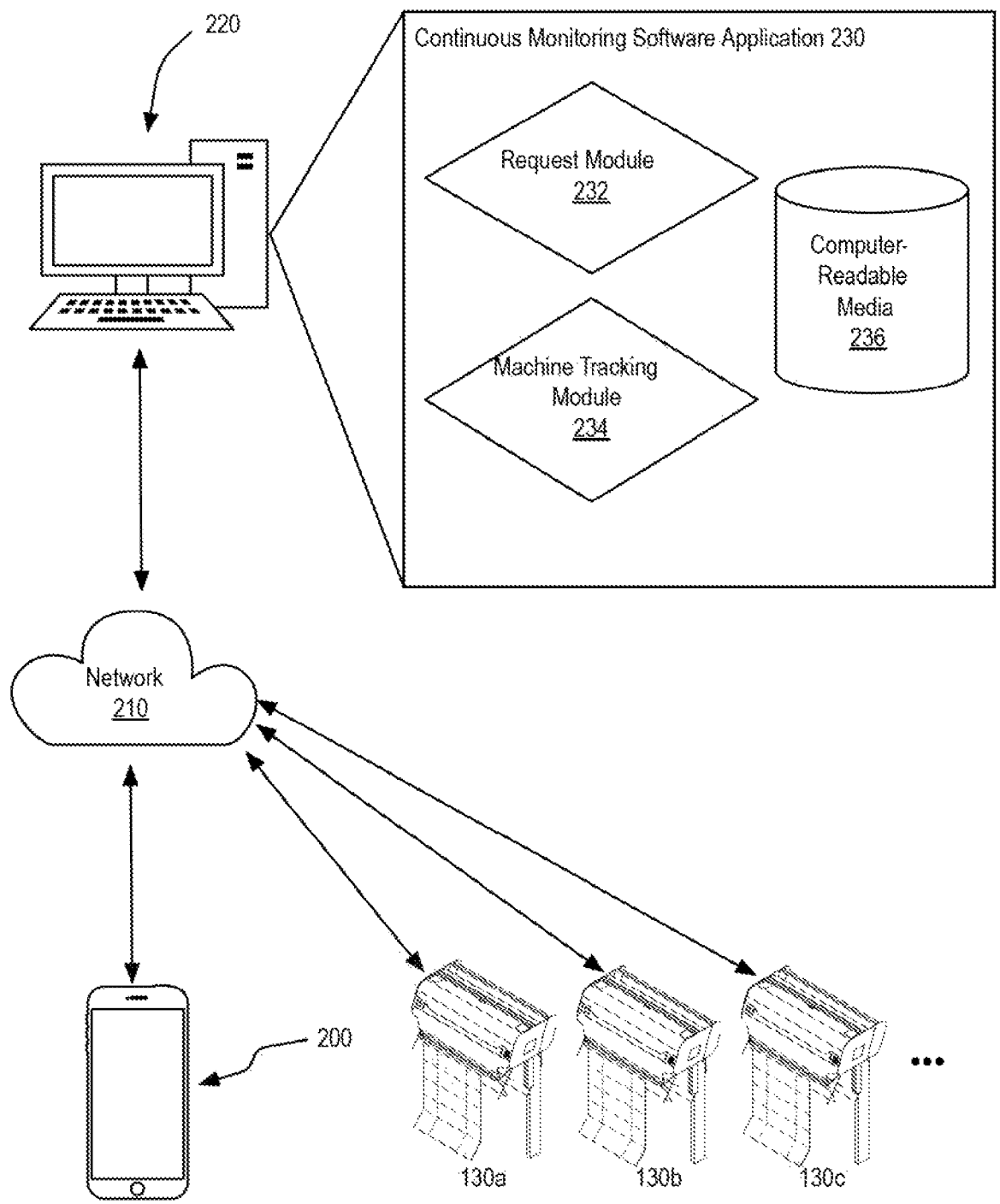
FIG. 2 illustrates a schematic diagram of a system of packaging production machines in communication with a server and a user computing device.

FIG. 2 illustrates a schematic diagram of a system of packaging production machines 130(a-c) in communication with a server 220 and a user computing device 200 through a network 210. The server 220 comprises one or more processors and one or more computer-readable media having stored thereon executable instructions that when executed by the one or more processors configure the computer system to execute various modules. As used herein, a "module" comprises computer executable code that performs a particular function. The module may interoperate with computer hardware during the execution of the computer executable code. As such by way of example, a "request module" is any combination of computer executable code and computer hardware that is configured to perform the described request functions.

In at least one embodiment, the server 220 receives, from the computing device 200, a request for a particular packaging design template. The computing device 200 may comprise a computer, mobile phone, tablet, or any other device capable of network communications. The communication may be generated within a web portal that is accessed by the computing device 200 or by an application that is executed locally on the computing device 200.

Upon receiving the request, a request module 232, within the continuous monitoring software application 230, identifies current system capabilities within a set of packaging production machines 130(a-c). To identify the current system capabilities, a machine tracking module 234 within the continuous monitoring software application 230 is configured to query the set of packaging production machines 130(a-c). In at least one embodiment, the packaging production machines within the set of packaging production machines 130(a-c) are located on different networks and at different geographic locations.

Additionally, to identify the current system capabilities, the continuous monitoring software application 230 then gathers current operating characteristics of each packaging production machine within the set of packaging production machines 130(a-c). The operating characteristics of the packaging production machines 130(a-c) may include, the size of corrugate associated with each packaging production machine, the type of corrugate associated with each packaging production machine, and various other characteristics that related to the corrugate available at the machine and/or the cutting and creasing tools available at the machine.

Further, to identify current system capabilities, the continuous monitoring software application 230 queries a queue module associated with each packaging production machine within the set of packaging production machines 130(a-c). In at least one embodiment, each of the packaging production machines 130(a-c) is associated with a different processor and different computer-readable media. Each computer-readable media is used to track a queue of packaging design templates that have been communicated to the respective packaging production machine. For example, a particular packaging production machine may have multiple packaging design templates in the queue ready to be manufactured.

Based upon the current system capabilities, the continuous monitoring software application 230 selects a particular packaging production machine within the set of packaging production machines 130(a-c) to produce the particular packaging design template. For example, selecting the particular packaging production machine 130a within the set of packaging production machines comprises identifying that the particular packaging production machine 130a is associated with a desired type of corrugate and identifying that the particular packaging production machine 130a is associated with a queue that is below a bandwidth threshold.

In at least one embodiment, the bandwidth threshold is dynamically determined to account for historic cycles in production. For example, the particular packaging production machine 130a may generally sit unused during early morning hours or evening hours. In such a case, the bandwidth threshold is automatically adjusted to account for the amount of excess production that is likely available at a particular time. For instance, the packaging production machine may sit relatively unused from 6 PM unit 6 AM. As such, the bandwidth threshold may be dynamically changed as the time gets closer to 6 AM. Such a system may determine that the particular packaging production machine 130a is capable of making one hundred packaging design templates in one hour. Using this information, the bandwidth threshold may be automatically adjusted to indicate an excess production availability of fifty packaging design templates at 5:30 AM because there is only half an hour remaining until the machine is historically at full use. Similar dynamic changes may be made at different times to account for different historical usage amounts of the particular packaging production machine 130a.

Upon selecting packaging production machine 130a, the server 220 communicates a command to the packaging production machine 130a to produce the particular packaging design template. Accordingly, disclosed embodiments provide for a system that allows a user to request a custom-made packaging design template be generated from a packaging production machine that is in a different geographic location and on a different network than the user. Such a feature may allow owners of packaging production machines to sell excess production capabilities on their packaging production machines to third parties without impacting their own production.

Figure 3:
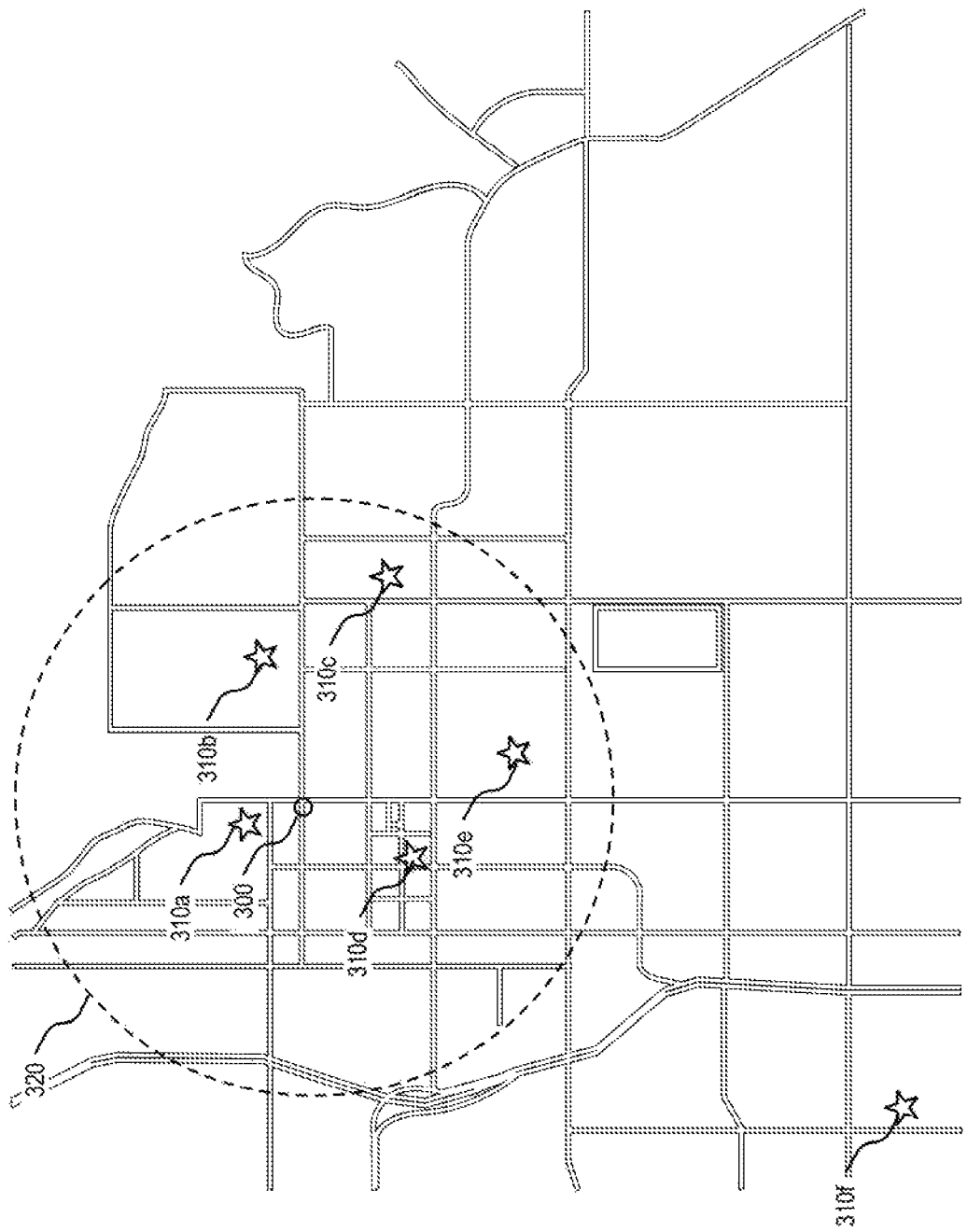
FIG. 3 illustrates a geographic map with indications relating to the location of the user and the locations of various packaging production machines.

FIG. 3 illustrates a geographic map with indications relating to the location 300 of the user and the locations 310(a-f) of various packaging production machines 130(a-c). In at least one embodiment, the server 220 receives, from the computing device 200, a geographic location 300 associated with the computing device 200. The geographic location may comprise a network address associated with the computing device 200 that is used for localization, a user-provided address, GPS coordinates, or any number of other means for determining a geographic location associated with the computing device 200.

Based upon the user's geographic location, the server generates a set of packaging production machines 130(a-c) represented by locations 310(a-f). In at least one embodiment, each packaging production machine within the set of packaging production machines 130(a-c) is selected based upon being within a threshold distance from the geographic location. For example, FIG. 3 depicts a threshold distance represented by circle 320. Packaging production machine locations 310(a-e) within the circle 320 are determined to belong to the set of packaging production machines 130(a-c). In contrast, packaging production machine 310f is outside the threshold distance and as such is excluded from the set of packaging production machines 130(a-c).

Accordingly, in at least one embodiment, a user may request on their computing device 200 a packaging design template. In response to the request, the server 220 determines the user's location. Based upon that location, the server identifies packaging production machines that are located within a threshold distance from the user. The continuous monitoring software application 230 then identifies a packaging production machine 130a that is capable of producing the desired packaging design template and has bandwidth to do so without interfering with the packaging production machines typical workload. Such a feature allows owners of packaging production machines 130(a-c) to monetize unused capacity in their machines. Conversely, such a feature allows individuals who would not otherwise have access to such a machine to generate their own custom-made packaging design templates.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
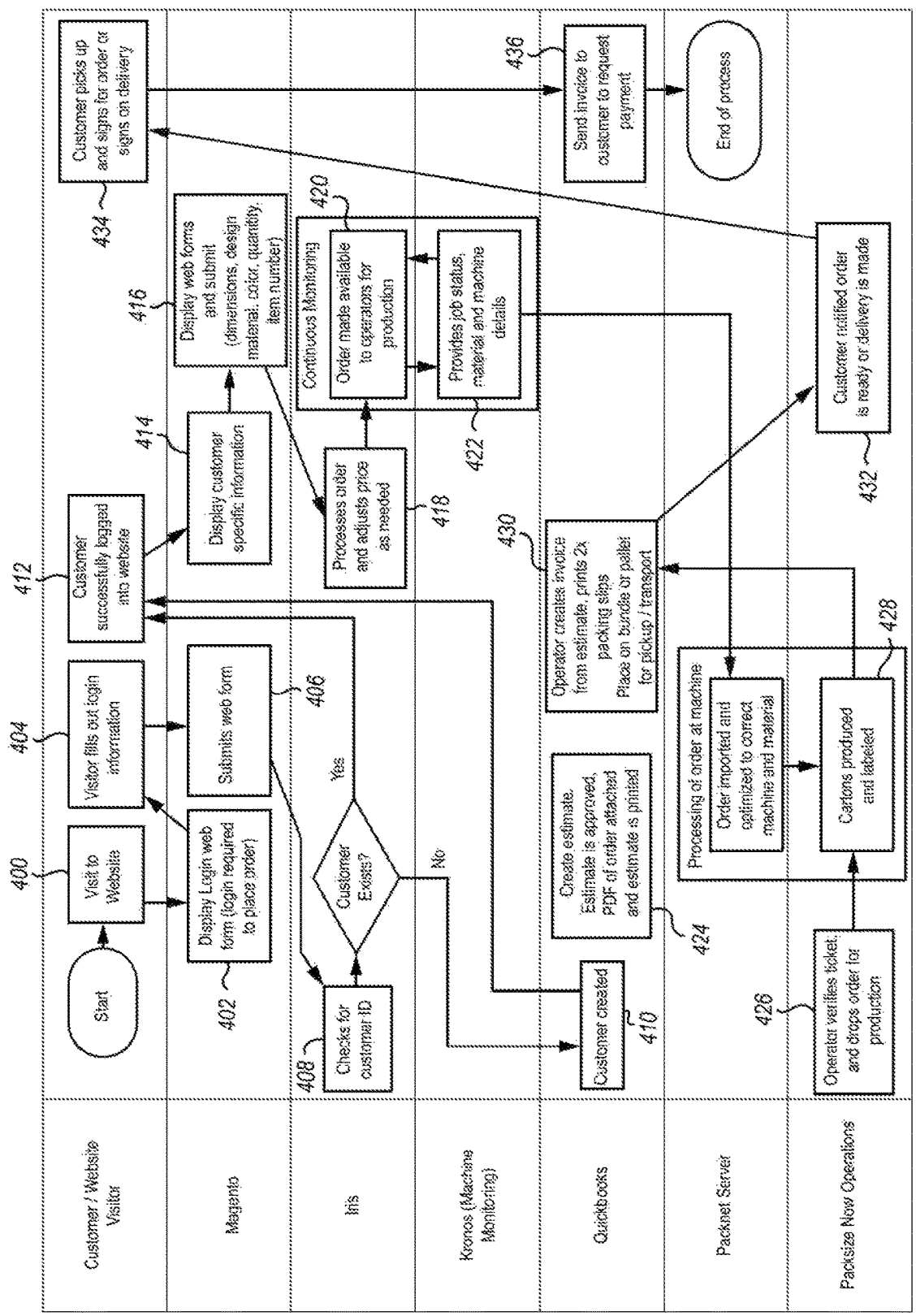
FIG. 4 illustrates a flowchart of steps in an embodiment of a method for automated third-party cost estimation and production of custom-packaging design templates.

Turning now to FIG. 4, a flowchart of steps within an embodiment of a method for automated third-party cost estimation and production of custom packaging design template is depicted. In at least one embodiment, the display flowchart depicts steps in a process for allowing third parties to utilize unused production time or idle time within a packaging system. For example, one can appreciate that packaging systems are complex machines that may primarily be present within large scale packaging warehouses. However, many smaller companies could also equally benefit from the production of custom packaging design templates. Accordingly, disclosed embodiments provide systems and methods for opening unused production time from a packaging system to other parties.

In at least one embodiment, a visitor visits a website (400) and is provided a log-in screen to authenticate into a user account (402). The visitor fills out the login information (404) and submits the webform (406). Upon receiving the webform the computer system checks for the customer ID in a business management database (408). In the case that the customer ID is not found, the system creates a new customer ID (410) within the business management system. The visitor is then successfully logged into the website (412).

The website displays customer-specific information to the visitor (414). The information may include previous customer packaging design template orders, contact information for the visitor, or other similar information (416). The webpage also displays web forms for receiving information about the requested custom packaging design template(s). The requested information may comprise dimensions, design, materials, color, quantity, item numbers, and other related inputs.

The computer system then processes the order and identifies a proper price point for the orders (418). The process of processing the order and identifying the price point may comprise accessing a continuous monitoring software application that is in communication with all available packaging-production machines within a given geographic area (420). The packaging-production machines may be located at different addresses, within different buildings, be owned by different companies, and otherwise unassociated with each other. Nevertheless, the continuous monitoring software application communicates to the various packaging systems and monitors the queue memory space associated with each packaging-production machine (422). The continuous monitoring software application may also map the historical production cycles of each packaging-production machine and identify projected future run cycles.

Additionally, the continuous monitoring software application also identifies operating characteristics of the available packaging-production machines. For example, different packaging-production machines may be associated with different widths and weights of corrugate. Some packaging-production machines may not be capable of producing especially large custom packaging design templates due to the narrow width of corrugate they are associated with. Similarly, it might be extremely inefficient to produce a small packaging production template at a packaging-production machine that is associated with a very large width of corrugate because there would be a large amount of wasted corrugate left behind. Using these various dynamic monitoring techniques, the continuous monitoring software application generates a real-time estimate of available queue bandwidth for the various production machines.

The continuous monitoring software application then communicates this information to the business management database. In turn the business management database generates a cost estimate for producing the requested custom-packaging design templates (424). In at least one embodiment, the business management database comprises a machine learning component, such as a neural network that is used to estimate the cost of producing the requested custom-packaging design templates. The cost estimate is based, at least in part, on the particular selected packaging-production machine. For example, the cost estimate takes into account the total amount of corrugate (including waste) required to generate the custom-packaging design template, the amount of time required to generate the custom-packaging design template, and the wear on the packaging-production machine in relation to the creation of the custom-packaging design template. The cost estimate is provided to a human operator for validation (426). The human operator is then able to reject the order or accept the order. If the order is accepted, the selected packaging system generates the custom-packaging design template (428).

The system then creates an invoice for the estimate and prints required packing slips (430). The completed custom packaging design templates and packing slips are placed on a bundle or pallet for the third-party to pick-up or delivery to the third-party. A notification is sent to the third party (also referred to above as the visitor) (432). Once the third-party picks up or receives and signs for the packaging design templates (434), the invoice is sent to the third-party (436).

Accordingly, in at least one embodiment, a third-party is able to purchase unused time on a packaging production machine. The packaging production machine may be selected from a set of packaging production machines that are spread out between different addresses, buildings, and different companies. The companies that own or manage the packaging production systems are also able to realize a higher return on their packaging production systems by selling time that would otherwise remain idle.

Figure 5:
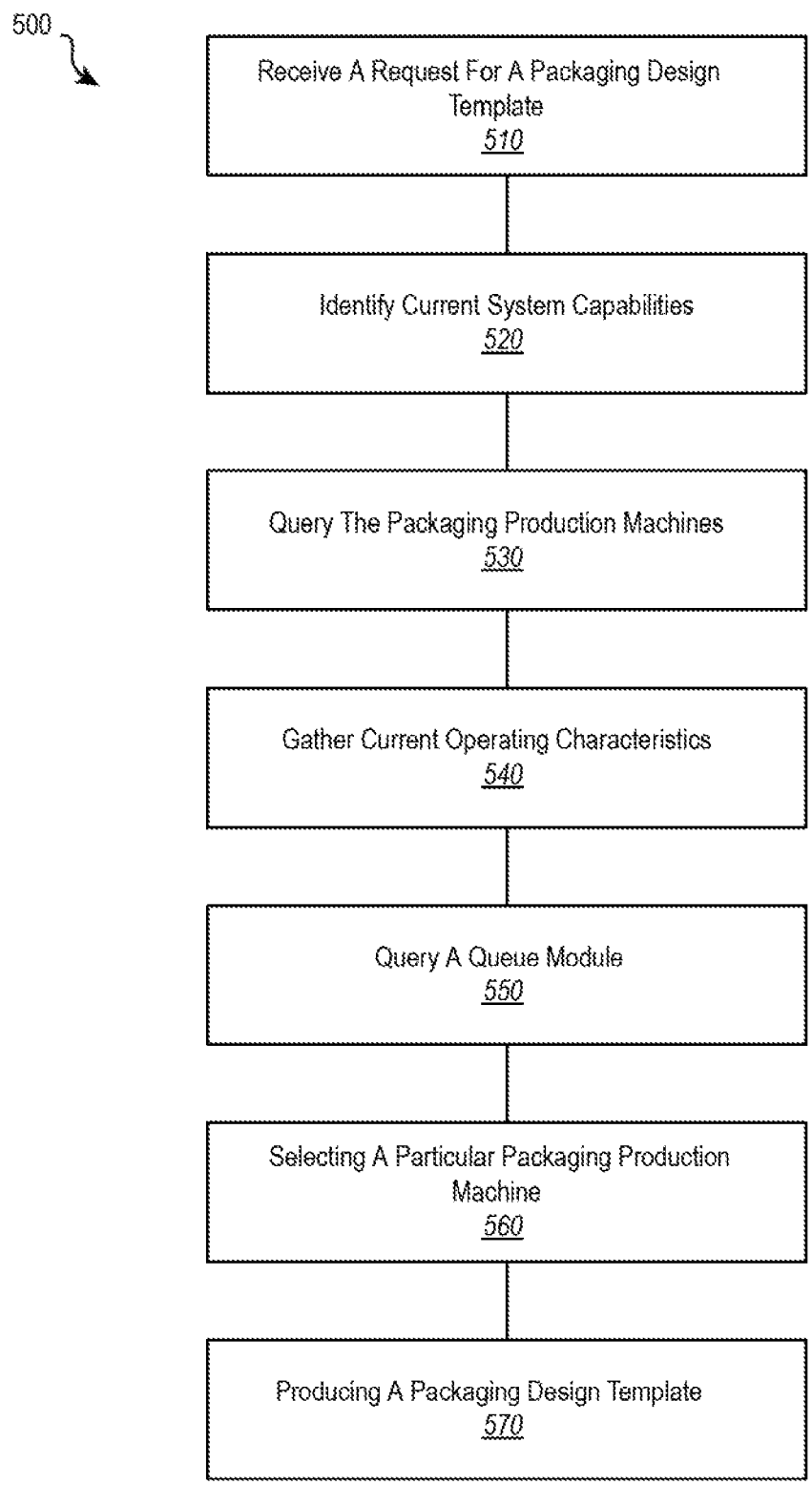
FIG. 5 illustrates a flowchart of steps in an embodiment of a method for automated third-party cost estimation and production of custom-packaging design templates.

Turning now to FIG. 5, FIG. 5 illustrates a flowchart of steps in an embodiment of a method 500 for automated third-party cost estimation and production of custom-packaging design templates. Method 500 includes an act 510 of receiving a request for a packaging design template 510. Act 510 comprises receiving, from a computing device, a request for a particular packaging design template. For example, as depicted and described with respect to FIGS. 2 and 4, a user's computing device 200 communicates with a server 220 through a network 210.

Method 500 also includes an act 520 of identifying current system capabilities. Act 520 comprises identifying, with a continuous monitoring software application, current system capabilities within a set of packaging production machines. The process of identifying current system capabilities includes act 530 of querying the set of packaging production machines, wherein packaging production machines within the set of packaging production machines are located on different networks and at different geographic locations.

Identifying current system capabilities also includes an act 540 of gathering current operating characteristics of each packaging production machine within the set of packaging production machines and an act 550 of querying a queue module associated with each packaging production machine within the set of packaging production machines. Method 500 further includes an act 550 of, based upon the current system capabilities, selecting a particular packaging production machine within the set of packaging production machines to produce the particular packaging design template. Further still, method 500 includes an act 570 of producing the particular packaging design template.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for automated third-party cost estimation and production management, comprising:
one or more processors; and
one or more computer-readable media having stored thereon executable instructions that when executed by the one or more processors configure the computer system to perform at least the following:
receive, from one or more scanning sensors, dimensions information for one or more target products;
based upon the dimensions information, identify, within a database, a particular packaging design template that is sized to fit the one or more target products;
receive, from a computing device, a request for the particular packaging design template;
query, with a continuous monitoring software application, a queue module associated with each packaging production machine within a set of packaging production machines, wherein the continuous monitoring software application is configured to:
based on the querying of the queue module, identify current system capabilities within the set of packaging production machines,
wherein:
the set of packaging production machines are located on different networks and at different geographic locations, and
the system capabilities include current operating characteristics of each packaging production machine within the set of packaging production machines;
based upon the current system capabilities, select a particular packaging production machine within the set of packaging production machines to produce the particular packaging design template; and
cause the particular packaging production machine to produce the particular packaging design template.

2. The computer system as recited in claim 1, wherein the executable instructions include instructions that are executable to configure the computer system to:
receive, from the computing device, a geographic location associated with the computing device.

3. The computer system as recited in claim 2, wherein the geographic location comprises a network address associated with the computing device.

4. The computer system as recited in claim 2, wherein the geographic location comprises a user-provided address.

5. The computer system as recited in claim 2, wherein the executable instructions include instructions that are executable to configure the computer system to:
based upon the geographic location, generate the set of packaging production machines, wherein each packaging production machine within the set of packaging production machines is selected based upon being within a threshold distance from the geographic location.

6. The computer system as recited in claim 1, wherein the current operating characteristics of each packaging production machine within the set of packaging production machines comprises:
a type of corrugate associated with each packaging production machine within the set of packaging production machines.

7. The computer system as recited in claim 1, wherein selecting the particular packaging production machine within the set of packaging production machines comprises:
identifying the particular packaging production machine within the set of packaging production machines that is associated with a desired type of corrugate; and identifying the particular packaging production machine within the set of packaging production machines that is associated with a queue that is below a bandwidth threshold.

8. The computer system as recited in claim 7, wherein the bandwidth threshold is dynamically determined to account for historic cycles in production.

9. The computer system as recited in claim 1, wherein selecting the particular packaging production machine within the set of packaging production machines comprises:
identifying the particular packaging production machine within the set of packaging production machines based upon historic cycles in production.

10. The computer system as recited in claim 1, wherein the queue module comprises a memory space associated with each packaging production machine within the set of packaging production machines.

11. A computer-implemented method for automated third-party cost estimation and production management, the computer-implemented method executed on one or more processors comprising:
receiving, from one or more scanning sensors, dimensions information for one or more target products;
based upon the dimensions information, identifying, within a database, a particular packaging design template that is sized to fit the one or more target products;
receiving, from a computing device, a request for a particular packaging design template;
querying, with a continuous monitoring software application, a queue module associated with each packaging production machine within a set of packaging production machines, wherein the continuous monitoring software application is configured to:
based on the querying of the queue module, identifying current system capabilities within the set of packaging production machines,
wherein:
the set of packaging production machines are located on different networks and at different geographic locations, and
the system capabilities include current operating characteristics of each packaging production machine within the set of packaging production machines;
based upon the current system capabilities, selecting a particular packaging production machine within the set of packaging production machines to produce the particular packaging design template; and
causing the particular packaging production machine to produce the particular packaging design template.

12. The computer-implemented method as recited in claim 11, further comprising:
receiving, from the computing device, a geographic location associated with the computing device.

13. The computer-implemented method as recited in claim 12, wherein the geographic location comprises a network address associated with the computing device.

14. The computer-implemented method as recited in claim 12, wherein the geographic location comprises a user-provided address.

15. The computer-implemented method as recited in claim 12, further comprising:
based upon the geographic location, generating the set of packaging production machines, wherein each packaging production machine within the set of packaging production machines is selected based upon being within a threshold distance from the geographic location.

16. The computer-implemented method as recited in claim 11, wherein the current operating characteristics of each packaging production machine within the set of packaging production machines comprises:
a type of corrugate associated with each packaging production machine within the set of packaging production machines.

17. The computer-implemented method as recited in claim 11, wherein selecting the particular packaging production machine within the set of packaging production machines comprises:
identifying the particular packaging production machine within the set of packaging production machines that is associated with a desired type of corrugate; and
identifying the particular packaging production machine within the set of packaging production machines that is associated with a queue that is below a bandwidth threshold.

18. The computer-implemented method as recited in claim 17, wherein the bandwidth threshold is dynamically determined to account for historic cycles in production.

19. The computer-implemented method as recited in claim 11, wherein selecting the particular packaging production machine within the set of packaging production machines comprises:
identifying the particular packaging production machine within the set of packaging production machines based upon historic cycles in production.

20. A computer program product comprising one or more computer storage media having stored thereon computer-executable instructions that, when executed at a processor, cause a computer system to perform a method for automated third-party cost estimation and production management, the method comprising:
receive, from one or more scanning sensors, dimensions information for one or more target products;
based upon the dimensions information, identify, within a database, a particular packaging design template that is sized to fit the one or more target products;
receiving, from a computing device, a request for the particular packaging design template;
query, with a continuous monitoring software application, a queue module associated with each packaging production machine within a set of packaging production machines, wherein the continuous monitoring software application is configured to:
based on the querying of the queue module, identifying current system capabilities within the set of packaging production machines,
wherein:
the set of packaging production machines are located on different networks and at different geographic locations, and
the system capabilities include current operating characteristics of each packaging production machine within the set of packaging production machines;
based upon the current system capabilities, selecting a particular packaging production machine within the set of packaging production machines to produce the particular packaging design template; and
cause the particular packaging production machine to producing the particular packaging design template.

* * * * *